(12) United States Patent
Kloppmann et al.

(10) Patent No.: US 7,499,906 B2
(45) Date of Patent: Mar. 3, 2009

(54) METHOD AND APPARATUS FOR OPTIMIZATION IN WORKFLOW MANAGEMENT SYSTEMS

(75) Inventors: Matthias Kloppmann, Sindelfingen (DE); Frank Leymann, Aidlingen (DE); Albert Maier, Tuebingen (DE); Bernhard Mitschang, Boeblingen (DE); Charles Daniel Wolfson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 11/497,422

(22) Filed: Aug. 2, 2006

(65) Prior Publication Data

US 2007/0055557 A1 Mar. 8, 2007

(30) Foreign Application Priority Data

Sep. 5, 2005 (EP) .................................. 05108096

(51) Int. Cl.
G06F 17/00 (2006.01)
G06F 17/30 (2006.01)
G06F 9/455 (2006.01)
(52) U.S. Cl. ................................ 707/1; 707/100; 718/1
(58) Field of Classification Search ...................... 707/1, 707/100; 718/100, 106
See application file for complete search history.

(56) References Cited

U.S. PATENT DOCUMENTS 5,890,133 A * 3/1999 Ernst .............................. 705/7
6,832,201 B1 * 12/2004 Leymann et al. ................ 705/7
6,938,240 B2 * 8/2005 Charisius et al. ............ 717/104

OTHER PUBLICATIONS

Knublauch et al, "Tool-supported process analysis and design for the development of multi-agent systems", LNCS 2585, pp. 186-197, 2003.*
Rinderle et al, "Integrating process learning and process evolution—A semantics based approach", LNCS 3649, pp. 252-267, 2005.*
Ebbers, Mike, et al., "Image and Workflow Library: MQ Series Workflow Concepts, Installation and Administration", *IBM International Technical Support Organization*, Apr. 1999. First ed. Poughkeepsie, New York.

* cited by examiner

*Primary Examiner*—Uyen T. Le
(74) *Attorney, Agent, or Firm*—Ingrid Foerster; SVL, IP Law

(57) ABSTRACT

Activities within a workflow are either data management activities (DMAs) or non-DMAs. A workflow is typically carried out by a system by executing one activity after the other. This can, however, be very time consuming. A method and system are provided for optimizing a group of activities (GOA) comprising a DMA, whereby the GOA is comprised in the workflow to improve the overall performance. The method determines the DMAs, and for each DMA, a data level statement (DLS). The GOA is determined and a process graph model (PGM) is determined from the GOA so that the DLS is comprised in the PGM and the semantics of the PGM are identical to those of the GOA. The PGM is optimized for which an optimized GOA is determined. The semantics of the optimized GOA are identical to those of the GOA. In the workflow, the GOA is replaced by the optimized GOA.

10 Claims, 12 Drawing Sheets

METHOD AND APPARATUS FOR OPTIMIZATION IN WORKFLOW MANAGEMENT SYSTEMS

BACKGROUND OF THE INVENTION

1. Field of the Invention

The present invention relates to the optimization of activities comprised in a workflow, in general, and to the optimization of data management activities comprised in a workflow, in particular.

2. Discussion of Related Art

Workflow management systems (WFMSs) are employed for the modelling and execution of business processes. Business processes specify which piece of work of a network of pieces of work is carried out in which sequence, and which resources are exploited to carry out the pieces of work. Individual pieces of work may be distributed across a multitude of different computer systems connected by some type of network. In a workflow management system, such as the product MQSeries workflow from IBM Cooperation, business processes are modelled as a network of activities. This network of activities is constructed using a directed, acyclic, weighted, colored graph as a meta model. The nodes of the graph represent the activities, which define individual tasks to be carried out. Any other meta model, such as a hierarchical meta model, may be used for constructing process models. In general, each of the activities is associated with a piece of code that implements the appropriate task for that activity. The edges of the graph, or the control links, describe a potential sequence of execution of the activities. Control links are also referred to in the following as links and are represented as arrows; the head of an arrow describes the direction in which the flow of control is moving through the process.

The activity where the control link starts is called the source activity and the activity where the control link ends is called the target activity. An activity may be a source and a target activity for different control links. Activities that have no incoming control link are called start activities, as they start the process. Activities that have no outgoing control link are called end activities, since after their completion the process has ended. An activity may be a start activity as well as an end activity. An activity that has multiple outgoing control links is called a fork activity and an activity with multiple incoming control links is called a join activity.

Different languages are available in order to implement a workflow into a workflow management system, and business process execution language (BPEL) is one such language. BPEL may be described as an XML based language that allows task sharing for a distributed computing environment using a combination of web services.

The term BPEL is sometimes also used to refer to other versions of the language, such as business process execution language for web services (BPEL4WS) or BPELWS. BPEL may also be described as a standard for describing and choreographing business process activities.

WebSphere Business Integration (WBI) products from IBM Cooperation provide an implementation for designing and executing BPEL based business processes. A component of WBI is named WebSphere Process Choreographer (WPC) workflow system.

The activities constituting a workflow can be distinguished basically into two different types.

Data management activities (DMAs): DMAs describe specific nodes in a workflow and express primarily data management activities, such as SQL statements, stored procedures, XQuery expressions, etc.

Non-DMAs: Non-DMAs describe specific nodes in a workflow that are not DMAs. A special type of a non-DMA is a convertible non-DMA. A convertible non-DMA can be converted into a DMA.

In a WFMS, a workflow is typically executed as a sequence of activities. Thus, each activity is handled one after the other. The execution of several DMAs one after the other can, however, be very time consuming especially if these DMAs relate to large amounts of data distributed over multiple computer systems of a network.

There is therefore a need for a method and system by which the overall performance of a workflow that comprises DMAs can be increased.

SUMMARY OF THE INVENTION

The present invention provides a data processing method for optimizing a group of activities (GOA), whereby the GOA is comprised in a workflow, and whereby the GOA comprises at least one DMA. The data processing method in accordance with the present invention comprises the steps of determining the at least one DMA, and determining for each of the at least one DMA at least one data level statement (DLS). The GOA is then determined, from which a process graph model (PGM) is determined, whereby the PGM comprises each of the at least one DLS, and whereby the semantics of the PGM are identical to the semantics of the GOA. An optimized PGM is determined from the PGM. Additionally, an optimized GOA is determined from the optimized PGM, whereby the semantics of the optimized GOA are identical to the semantics of the optimized PGM. In the workflow, the GOA is replaced by the optimized GOA.

The present invention is particularly advantageous as it provides an optimized GOA which replaces a GOA comprised in a workflow. The optimized workflow is generally executed faster than the original workflow. The method in accordance with the present invention therefore contributes to an improvement of the overall performance of a WFMS.

In an embodiment of the present invention, the workflow further comprises at least one convertible non-DMA for which at least one DMA is determined by the method in accordance with the present invention. This has the advantage that activities that have initially been non-DMA activities are optimized by the method in accordance with the present invention. This contributes to an improvement of the overall performance of the optimized workflow.

In another embodiment of the present invention, at least one DMA is determined for which at least one DLS is determined by use of a tag being assigned to each of the at least one DMA, whereby each tag comprises meta information describing the DLS, or by use of a registered function, wherein the registered function is adapted to receive the at least one DMA and returns the meta-information for the at least one DLS.

It is particularly advantageous to determine DMAs by tags that comprise meta-information about the DLS, since the method in accordance with the present invention only has to scan the workflow description determining the DMAs and the corresponding DLSs.

The data processing method in accordance with the present invention provides a register for the registration of functions. A user can, for example, specify functions so that the method in accordance with the present invention can be adapted to determine DMAs and the corresponding DLS. This has the advantage that the method in accordance with the present invention can be very flexible and can be adapted easily.

If a WFMS does not provide meta information about DMAs in form of tags or does not know which activities built by other products are DMAs, the user of the WFMS can register the DMAs and the corresponding functions for transforming the DMAs into DLSs.

In another embodiment of the present invention, the GOA comprises a sequence of data management activities (DMAs), whereby the sequence of DMAs relates to an information management system (DBMS), which comprises an optimization component. The optimized PGM is determined from the PGM by the method in accordance with the present invention by use of the optimization component. It is particularly advantageous to use the optimization component, since an already existing, highly developed component can be employed. This saves time and money for the development of a method and system in accordance with the present invention.

In another embodiment of the present invention, the PGM comprises a pattern and the optimized PGM is determined from the PGM by optimizing the pattern. The present invention is particularly advantageous as it enables the optimization of frequently occurring patterns that comprise DMA, since it is sometimes hardly possible to optimize such patterns by use of an optimization component.

In another embodiment of the present invention, the GOA comprises an activity for performing a loop operation, whereby the activity comprises a DMA. A DLS is determined for the DMA, and a PGM is determined, whereby the PGM comprises a pattern which comprises the activity for performing the loop operation and the DLS. The optimized PGM is determined from the PGM by optimizing the pattern. The present invention is particularly advantageous as it enables the optimization of patterns that comprise a loop operation over a DMA. The reason is that such a pattern is frequently occurring in workflows.

In another embodiment of the present invention, the GOA comprises an activity for performing a loop operation, whereby the activity for performing the loop operation comprises a DMA and a web service (WS). A DLS is determined for the DMA and the WS, and a PGM is determined, whereby the PGM comprises a pattern which comprises the activity for performing the loop operation and the DLS. The optimized PGM is determined from the PGM by optimizing the pattern. The present invention is particularly advantageous as it enables the optimization of patterns that comprise a loop operation over a DMA and a WS. The reason is that such a pattern is frequently occurring in workflows.

In another embodiment of the present invention, the GOA comprises an activity for performing a loop operation, whereby the activity for performing a loop operation comprises a DMA and a transition condition (TC). A DLS is determined for the DMA and the TC. A PGM is determined, whereby the PGM comprises a pattern which comprises the activity for performing the loop operation and the DLS. The optimized PGM is determined from the PGM by optimizing the pattern. The present invention is particularly advantageous as it enables the optimization of patterns that comprise a loop operation over a DMA and a TC. The reason is that such a pattern is frequently occurring in workflows.

The method in accordance with the present invention is, however, not limited to the optimization of the pattern described above. More complicated patterns (e.g., patterns comprising several DMAs, WSs, and TCs) can be optimized.

In another embodiment of the present invention, the workflow comprises at least one workflow variable that is used in the GOA, but not in the optimized GOA. This variable is redundant and eliminated in the workflow if it is additionally redundant with respect to the complete workflow. The dropping of a redundant variable leads generally to an improvement of the overall performance of the workflow.

In a further embodiment of the present invention, the at least one DLS is determined for each of the at least one DMA by use of an interactive or collaborative optimization component. An interactive or collaborative optimization component is a component which requests a user to assist during the optimization (e.g., to determine a DLS for a DMA). This has the advantage that the scope and quality of the optimization can be improved, especially in the case when meta-information about the behavior of the activity is missing or cannot be determined programmatically.

In another aspect, the present invention relates to a computer program product which comprises computer executable instructions in order to perform the method.

In another aspect, the present invention relates to a data processing system for optimizing a GOA which is comprised in a workflow, whereby the GOA comprises at least one DMA and whereby the data processing system comprises means for determining the at least one DMA, means for determining for each of the at least one DMA at least one DLS, means for determining the GOA, means for determining a PGM, whereby the PGM comprises each of the at least one DLS, and whereby the semantics of the PGM are identical to the semantics of the GOA. The system in accordance with the present invention further comprises means for determining an optimized PGM from the PGM, means for determining an optimized GOA from the optimized PGM, whereby the semantics of the optimized GOA are identical to the semantics of the optimized PGM, and means for replacing in the workflow the GOA by the optimized GOA.

The method and system in accordance with the present invention are particularly advantageous because one or several group of activities (GOAs) comprised in a workflow are replaced by one or more optimized GOAs, whereby the semantics of the one or several GOAs are left unchanged and whereby the overall performance of the workflow is typically improved.

BRIEF DESCRIPTION OF THE DRAWINGS

In the following, preferred embodiments of the present invention will be described in greater detail by way of example only and making reference to the drawings in which.

DETAILED DESCRIPTION

Figure 1:
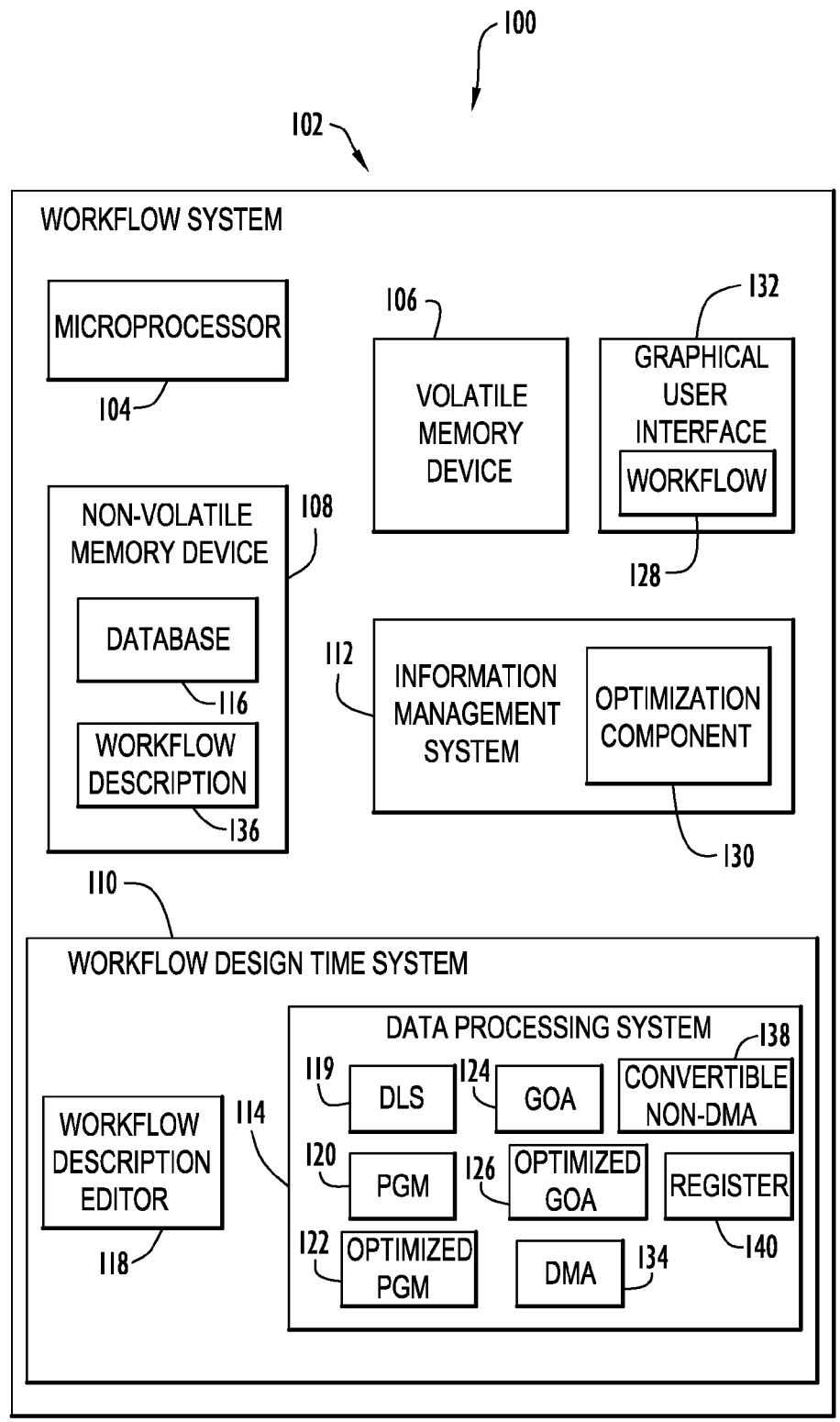
FIG. 1 depicts a block diagram of a workflow system.

FIG. 1 depicts a block diagram 100 of a workflow system 102. The workflow system 102 comprises a microprocessor 104, a volatile memory device 106, a non-volatile memory device 108, a workflow design time system 110, an information management system 112, and a graphical user interface 132.

The workflow design time system 110 comprises a data processing system 114 in accordance with the present invention and a workflow description editor 118. The workflow design time system 110 enables a user to create a graphical representation of a workflow 128 on the graphical user interface 132. The workflow description editor 118 generates, by employment of the microprocessor 104, a workflow description 136 (for example in BPEL) from the graphical representation of the workflow 128. The workflow description 136 is stored on the non-volatile memory device 108. Alternatively, the workflow description is stored on the volatile memory device 106.

In operation, the data processing system 114 determines a DMA 134 which is comprised in the workflow description 136 and determines further for the DMA a data level statement (DLS) 119. The data processing system 114 identifies a group of activities (GOA) 124 which comprises the DMA 134. A process graph model 120 is then determined so that the semantics of the PGM 120 are identical to the semantics of the GOA 124, whereby the PGM 120 comprises the DLS 119.

The GOA 124 can, for example, comprise a sequence of data management activities (DMAs). The corresponding PGM 120 comprises a sequence of data level statements (DLSs). DLSs are typically implemented by use of the structured query language (SQL).

The information management system 112 comprises an optimization component 130. The information management system 112 is, for example, a database management system (DBMS) and the optimization component 130 is, for example, a multi-query optimizer of a DBMS. If the PGM 120 comprises a sequence of DLSs, then the optimization component 130 is preferably used for the determination of an optimized PGM 122.

The method in accordance with the present invention is, however, not restricted to the optimization of DMAs for which the corresponding DLSs are described by SQL statements. A DLS can also be optimized by the method in accordance with the present invention if it is described in an alternative language, such as, for example, XQuery.

The GOA 124 to be optimized can further comprise activities that are non-DMAs. For example, the GOA can comprise a convertible non-DMA 138. The manner in which a GOA 124 that additionally comprises a non-DMA is optimized is described further below by way of example.

The data processing system 114 determines by use of the microprocessor 104 an optimized GOA 126 from the optimized PGM 122, whereby the semantics of the optimized GOA 126 are identical to the semantics of the optimized PGM 122. The GOA 124 is replaced in the workflow description 136 and correspondingly in the graphical description of the workflow 128 by the optimized GOA 126 in the workflow description 136. Since the semantics of the optimized PGM 122 has not changed with respect to the PGM 120, the semantics of the optimized GOA 126 has not changed with respect to the semantics of the GOA 124.

The data processing system further comprises a register 140. That register comprises a user interface by which a user can specify functions. For example, if a data processing system does not determine a DMA in a workflow, the user can adapt the system by defining a specific function that the DMA is determined in the future. Moreover, the user can be requested, via the user interface, to determine a DLS for a DMS or to provide a specific function by which the system in accordance with the present invention is able to determine a DLS for a DMS.

As shown in diagram 100, the data processing system 114 can be comprised in the design time system 110. It can alternatively be integrated into the run time component of a WFMS. It can also be employed during the deployment of the workflow.

A workflow may comprise a DMA which relates to a data source and that the data source is not yet specified during design time. Hence, the DMA will not yet be identified as a DMA. Such a DMA would, however, be identified if the data processing system 114 would be integrated in the run time system. It is therefore particularly advantageous to integrate a data processing system in accordance with the present invention into the run time system of a WFMS.

Figure 2:
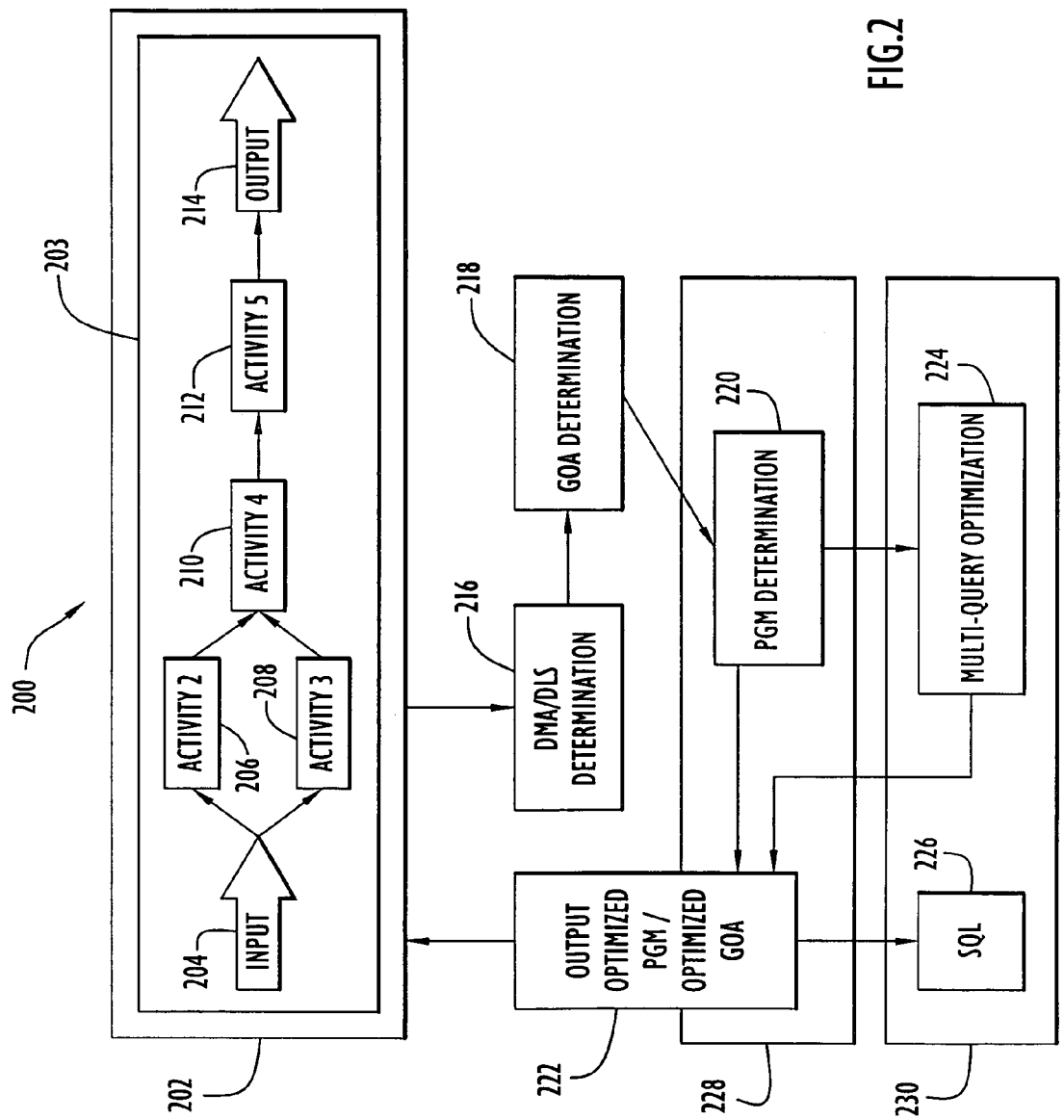
FIG. 2 depicts schematically how an optimized GOA is determined.

FIG. 2 depicts schematically a diagram 200 of how an optimized GOA is determined by the method in accordance with the present invention. The workflow to be optimized as well as the components employed for the optimization can be assigned to several layers. The first layer is referred to as process-description-language layer 202. On this layer, the workflow description editor generates a workflow 203 which comprises an input activity 204, a second activity 206, a third activity 208, a fourth activity 210, a fifth activity 212, and an output activity 214. The workflow 203 can, for example, be implemented by use of the business process execution language (BPEL).

The data processing method in accordance with the present invention determines the one or more DMAs comprised in the workflow 203 and the corresponding DLS. This is indicated in diagram 200 by DMA/DLS determination component 216. Additionally, the GOA is determined by use of the DMA as is indicated in diagram 200 by the GOA determination component 218. The DMA/DLS determination component 216 and GOA determination component 218 map from the process-description-language layer 202 to the layer which is referred to as process-language and infrastructure independent layer 228.

On the process-language and infrastructure independent layer 228, the PGM is determined as indicated by the PGM determination component 220. From the PGM, an optimized PGM is determined which is then transformed into an optimized GOA. This is indicated in diagram 200 by the field optimized PGM/optimized GOA 222. The optimized PGM can, for example, be determined by use of a multi-query optimizer 224, whereby the multi-query optimizer is comprised in the infrastructure-dependent layer 230. The multi-query optimizer is generally employed for the optimization if the PGM has a simple structure, for example, if it comprises a sequence of SQL statements.

Alternatively, the optimized PGM can be determined by the recognition of patterns comprised in the PGM. This is described by way of example below. The optimized GOA is determined, for example, by wrapping the optimized PGM, which can for example be given by a sequence of SQL statements, into one or more activities. Additionally, SQL artifacts 226 can be generated during the determination of the optimized PGM. The optimized GOA replaces in the workflow 203 the GOA which has been determined by GOA determination 218.

As mentioned above, the optimization component of the information management system can be used to determine an optimized PGM if the PGM contains DLSs, such as only a sequence of SQL statements. Alternatively, the optimized PGM can be determined by the recognition of patterns that are comprised in the PGM.

Generally, four classes of scenarios referred to as optimization patterns are frequently occurring in workflow management systems. The method in accordance with the present invention is particularly suited for optimizing these four patterns within a workflow management system. Detailed information on each pattern is provided in the following, by way of example only, and concrete instantiations are listed as well.

Figure 3:
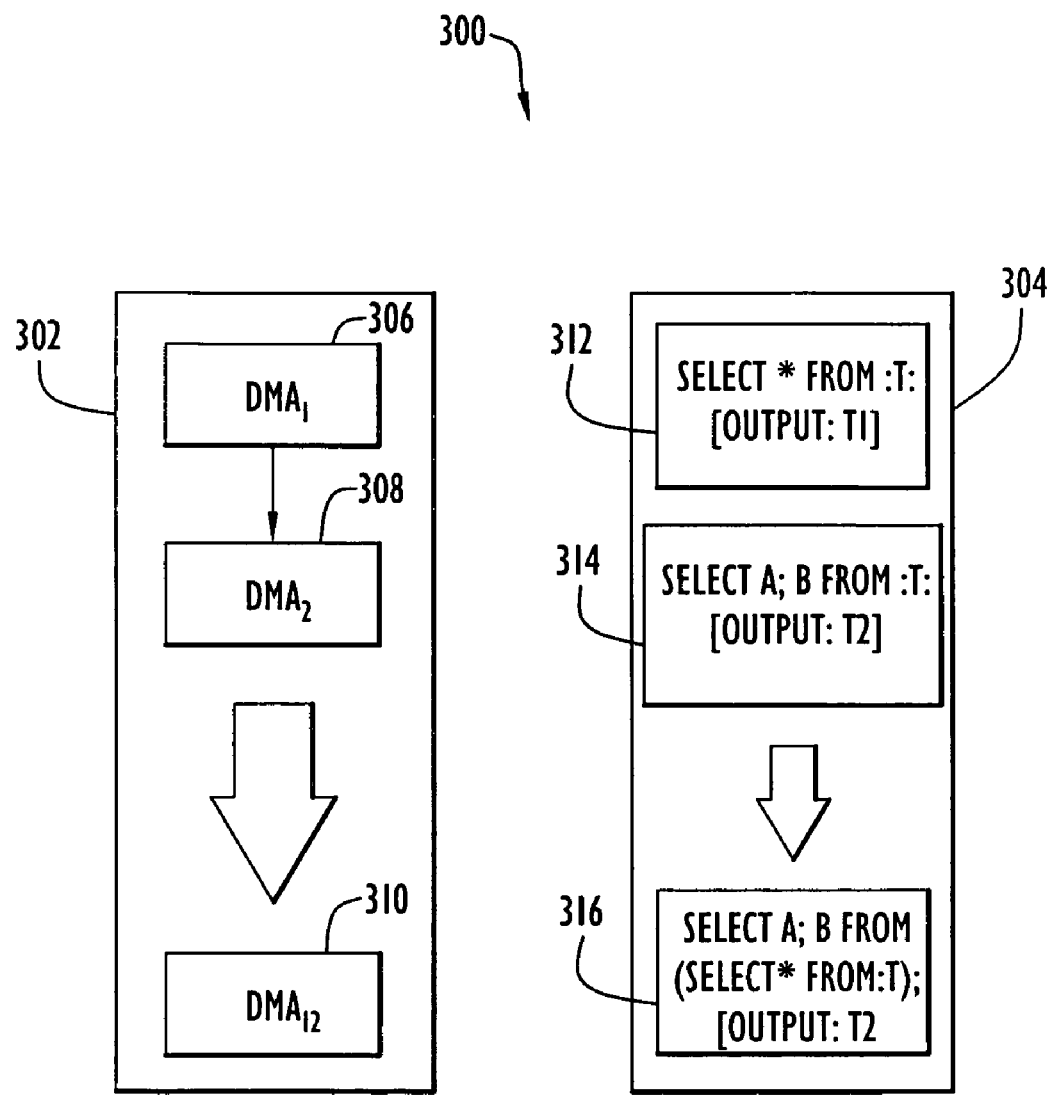
FIG. 3 illustrates how a first pattern is optimized.

FIG. 3 illustrates how pattern I is optimized. Pattern I is characterized in that it comprises a sequence of DMAs. However, the method in accordance with the present invention is not restricted to the optimization of sequences. It is also possible to optimize a flow of DMAs. Diagram 300 is only an example of a pattern in which the GOA to be optimized only comprises DMAs.

FIG. 3 can be divided into the parts 302 and 304, whereby part 302 represents the DMA level of the workflow (corresponding to the process-description language layer) and part 304 represents the DLS level of the workflow (corresponding to the infrastructure dependent layer). The initial group of DMAs to be optimized in accordance with the present invention comprises a sequence of DMAs, $DMA_1$ 306 and $DMA_2$ 308. The arrow pointing from $DMA_1$ 306 to $DMA_2$ 308 indicates that $DMA_1$ 306 is executed before $DMA_2$ 308.

In the example given in diagram 300, $DMA_1$ 306 and $DMA_2$ 308 are two SQL statements wrapped into the activities. On the DLS level 304, the sequence of $DMA_1$ 306 and $DMA_2$ 308 corresponds to the sequence of SQL statements 312 and 314, whereby SQL statement 312 is:

SELECT * FROM :T; and SQL statement 314 is:

SELECT A;B FROM :T;

The SQL statements 312 and 314 are obtained from unwrapping the SQL statements comprised in $DMA_1$ and $DMA_2$, respectively. The sequence of SQL statements 312 and 314 is preferably optimized by an optimization component of an information management system, which can, for example, be a multi-query optimizer. The result of the optimization is SQL statement 316, which reads as:

SELECT A; B FROM (SELECT * FROM:T);

The sequence of SQL statement 312 and 314 is thus transformed into one SQL statement 316, whereby the semantics of the SQL sequence 312, 314 and the SQL statement 316 are identical.

The SQL statement 316 is then transformed back to the DMA level 302 which yields $DMA_{1,2}$ 310. The transformation is, for example, carried out by wrapping the SQL statement in $DMA_{1,2}$. The semantics of $DMA_{1,2}$ 310 and the sequence of $DMA_1$ 306 and $DMA_2$ 308 are also identical. The advantage of executing $DMA_{1,2}$ instead of $DMA_1$ and $DMA_2$ is however that $DMA_{1,2}$ is generally processed faster.

Figure 4:
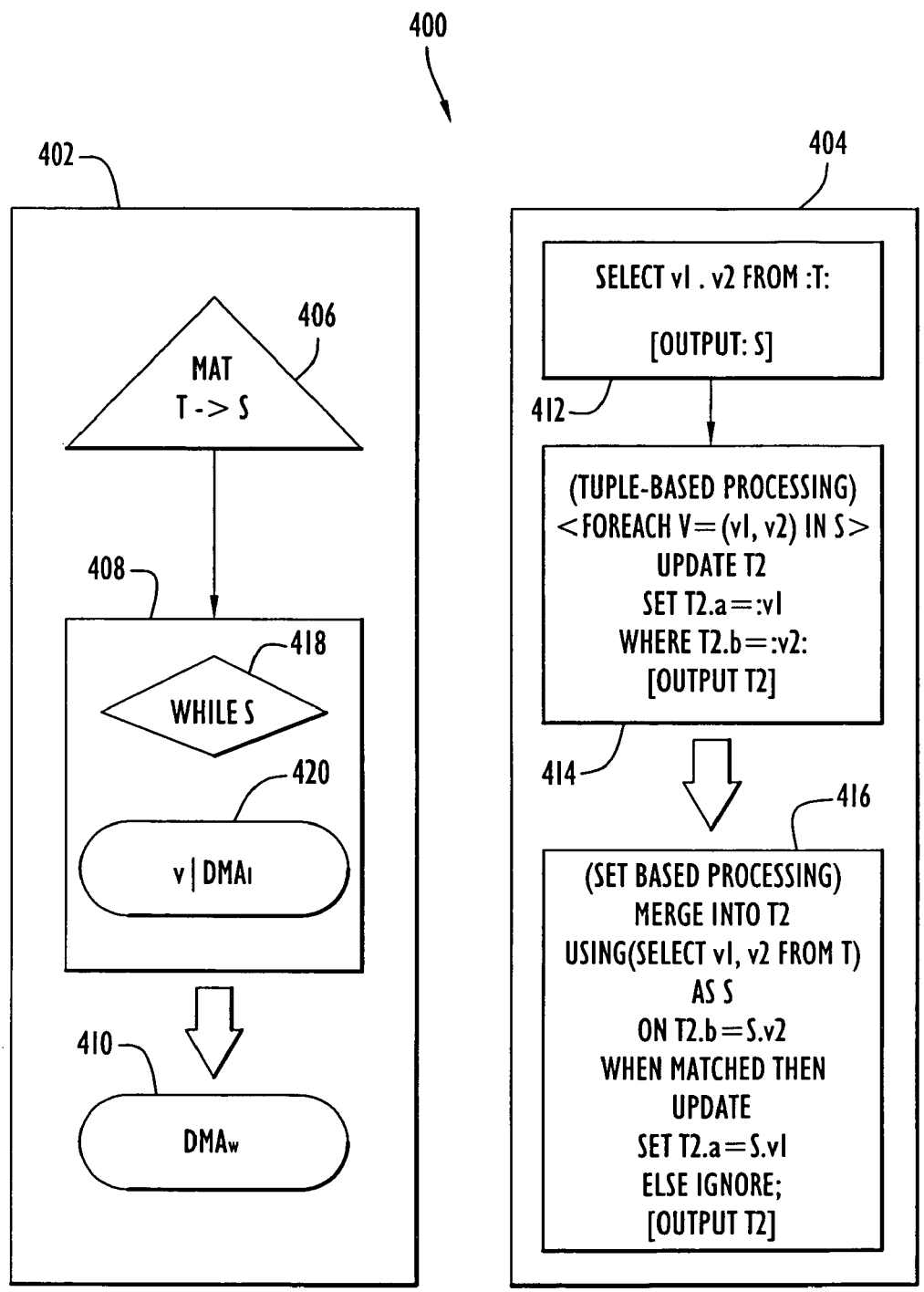
FIG. 4 illustrates how a second pattern is optimized.

FIG. 4 illustrates how pattern II is optimized. Pattern II is characterized in that it comprises a tuple to set optimization process in accordance with the present invention. Diagram 400 of FIG. 4 can be divided into the parts 402 and 404, whereby part 402 represents the DMA level of the workflow (corresponding to the process-description language layer) and part 404 represents the DLS level of the workflow (corresponding to the infrastructure dependent layer).

The initial GOA to be optimized in accordance with the present invention comprises a materialization operation 406 and a loop operation over a DMA 408. The materialization operation 406 is, in this example, the command to read the content of a table T into the set S. The loop operation over a DMA 408 is a WHILE operation 418 over a DMA 420 which is only executed if the argument in the WHILE operation 418 is true.

The materialization operation 406 and the loop operation over a DMA 408 are identified as a GOA to be optimized because they fulfil pattern II. On the DLS level 404, the materialization operation 406 corresponds to the SQL statement 412 which reads as:

SELECT V1, V2 from :T;

The semantics of the loop operation over a DMA 408 can be described as shown in the DLS 414 by the following artificial language, which is similar to SQL:

<for Each V=(V1,V2) in S>

UPDATE T2

SET T2.a=: V1

WHERE T2.b=: V2;

The PGM comprising SQL statement 412 and DLS 414 is then optimized by the method in accordance with the present invention. The result is DLS 416 which contains the following SQL statements:

MERGE INTO T2

USING (SELECT V1, V2 FROM T)

AS S

ON T2.b=S.V2

WHEN MATCHED THEN

UPDATE

SET T2.a=S.V1

ELSE IGNORE;

The difference between the PGM and the optimized PGM comprising DLS 416 is that the PGM is processed in a tuple-based manner while the optimized PGM is processed in a set-based manner. The DLS 416 is then wrapped into a BPEL process which yields $DMA_W$ 410, the optimized GOA.

The tuple-based manner of processing data is transformed into a set-based manner of processing data. This is particularly advantageous since set-based processing of data is typically significantly faster than tuple-based data processing.

Figure 5:
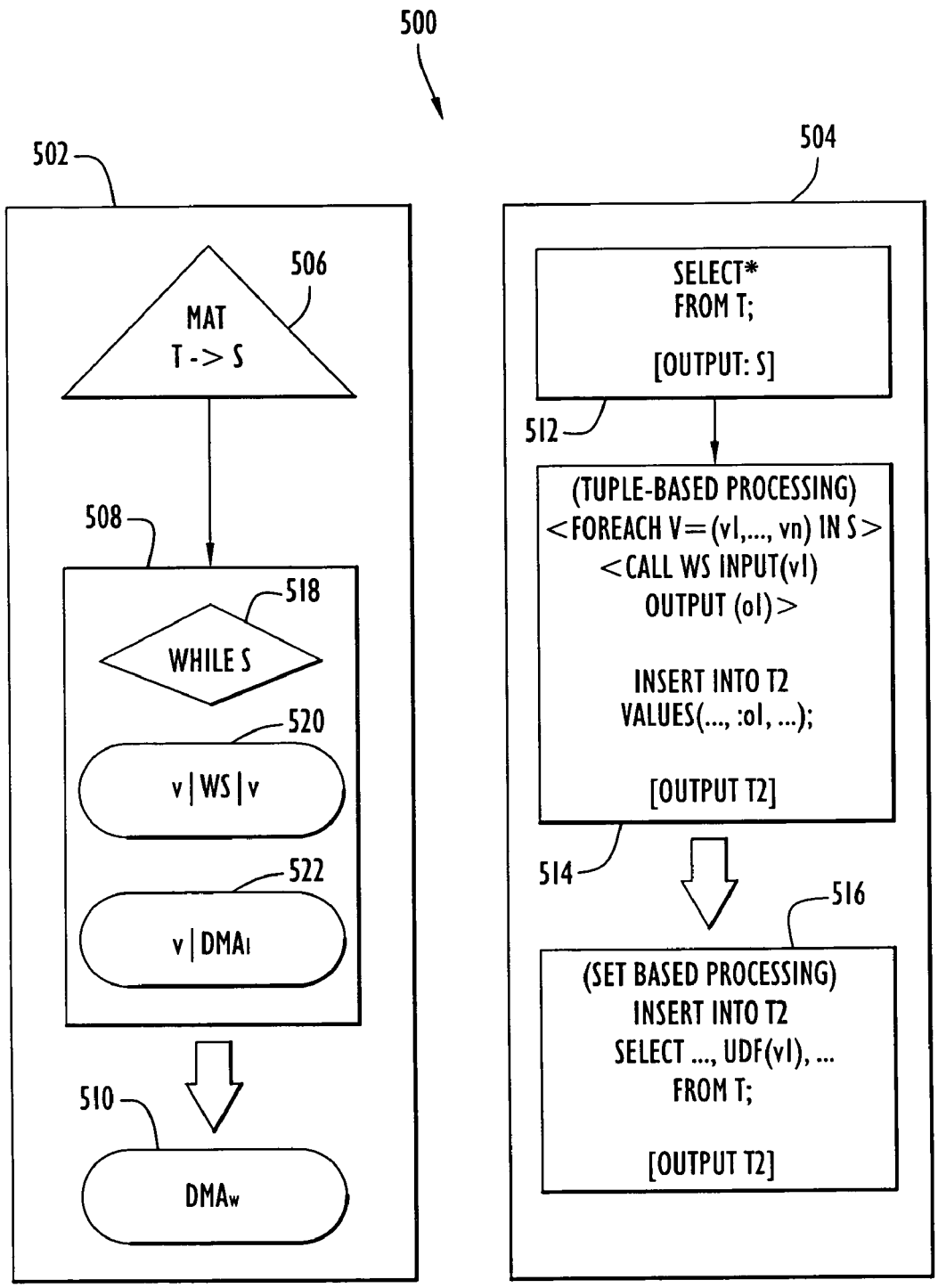
FIG. 5 illustrates how a third pattern is optimized.

FIG. 5 illustrates how pattern III is optimized. Pattern III is characterized in that it comprises one web service (WS) and one DMA. Data is processed in a tuple-based manner whereas after the optimization, data is processed in a set-based manner. Diagram 500 of FIG. 5 can be divided into parts 502 and 504, whereby part 502 represents the DMA level of the workflow (corresponding to the process-description language layer) and part 504 represents the DLS level of the workflow (corresponding to the infrastructure dependent layer).

The GOA to be optimized in accordance with the present invention comprises a materialization operation 506 and a loop operation over a DMA and a WS 508. The materialization operation 506 is, in this example, the command to read the content of table T into the set S. The corresponding SQL statement is wrapped into the materialization component 506.

The loop operation over a DMA and a WS 508 contains an SQL WHILE operation 518, a web service 520 and a DMA 522 that are executed while the argument of the WHILE operation 518 is true. Moreover, the web service 520 uses, for example, a single value from the set S as input and delivers another value as output. The DMA 522 uses the output of the web service 520 as a parameter.

The WHILE loop as well as the WS 520 are convertible non-DMAs. Hence, the loop over a DMS and a WS 508 can be transformed to a DLS 514. The semantics of DLS 514 can be described by the following artificial language.

<for Each V=(V1, ..., Vn) in S>

<call WS input (V1)

OUTPUT (V1)>

INSERT INTO T2

VALUES (: ..., :01, ... );

whereby WS refers to the web service 520.

On the DLS level 504, the materialization component 506 corresponds to the SQL statement 512 which is

SELECT *

FROM T;

The method in accordance with the present invention determines a DLS 516 which is characterized in that it processes data in a set-based manner. The semantics of the DLS 516 can be represented by use of the artificial language by:

INSERT INTO T2

SELECT ..., UDF(v1), ...

FROM T;

whereby UDF is a user defined function calling the web service 520.

The DLS 516, which is generally determined in form of an SQL statement, is wrapped into the $DMA_w$ 510. Thus, the GOA which comprises the materialization component 506 and the loop over a WS and a DMA 508 has been optimized to an optimized GOA which comprises $DMA_w$ 510. The tuple-based manner of processing data is thus transformed into a set-based manner of processing data. Activities which process data in a set-based way are usually executed faster than activities that are executed in a tuple-based way. Hence, the method in accordance with the present invention improves the overall performance of a workflow that comprises a GOA with at least one DMA and at least one WS.

Figure 6:
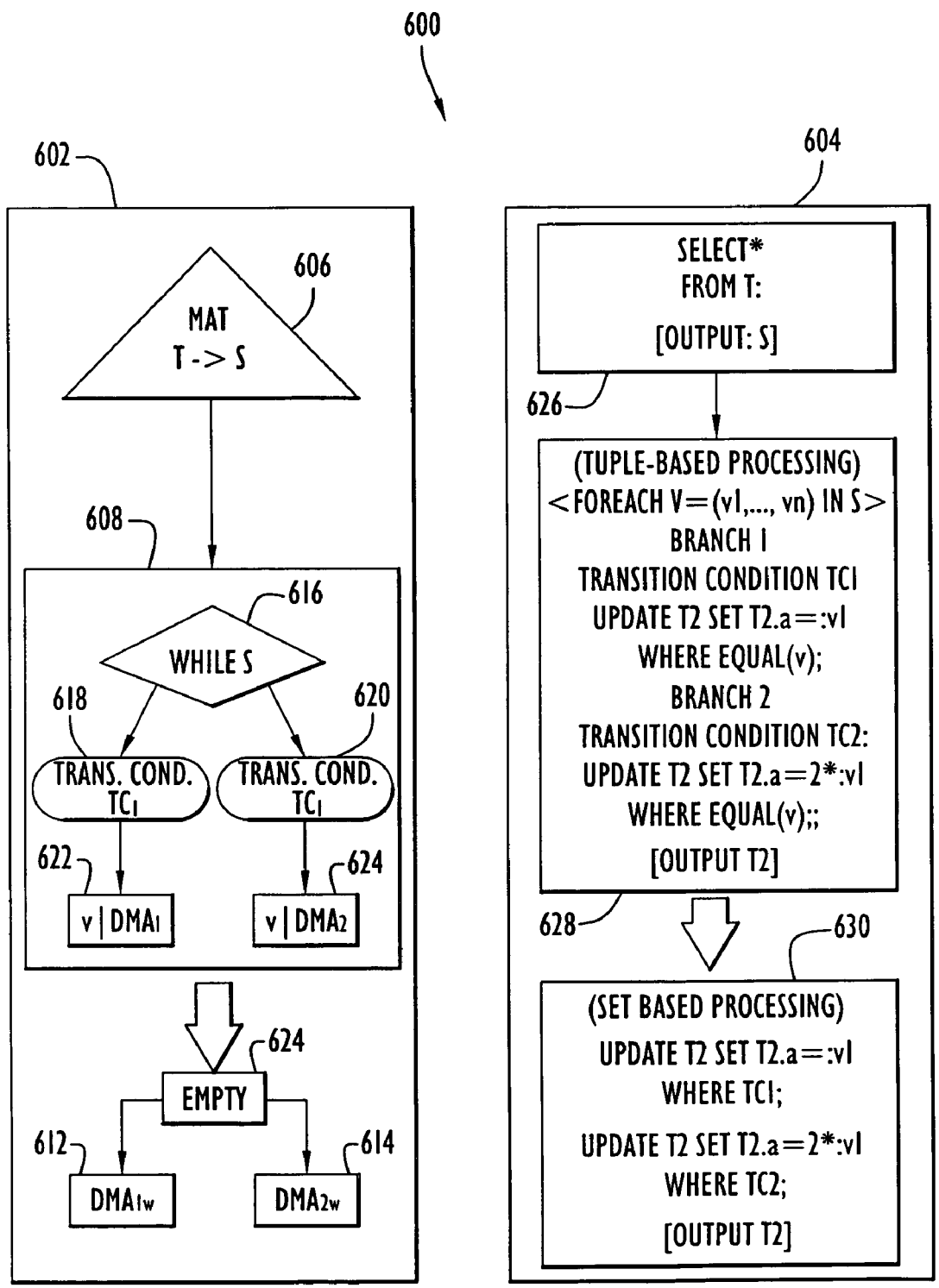
FIG. 6 illustrates how a fourth pattern is optimized.

FIG. 6 illustrates how pattern IV is optimized. Pattern IV is characterized in that it comprises at least one DMA and a transition condition (TC). Diagram 600 of FIG. 6 can be divided into the parts 602 and 604. Part 602 represents the DMA level (corresponding to the process-description-language layer) and part 604 represents the DLS level of the workflow (corresponding to the infrastructure dependent layer).

The GOA to be optimized in accordance with the invention comprises the materialization operation 606 and of the loop operation over two DMA comprising two transition conditions 608. The materialization operation is a convertible non-DMA which is, in this example, a command to read the content of a table T into the set S.

The loop operation 608 contains a WHILE operation 616, a $DMA_1$ 622, a $DMA_2$ 624 and the transition conditions 618 and 620. $DMA_1$ 622 is only executed if the argument of the WHILE operation 616 is true and if the transition condition 618 holds. $DMA_2$ 624 is only executed if the argument of the SQL operation 616 is true and if condition 620 holds. On the DLS level 602, the materialization operation 606 relates to the DLS 626 which is given in form of an artificial language employed to represent the semantics of DLS 626:

SELECT*

FROM T;

Additionally, the loop operation 608 relates to the DLS 628 which is given in form of an artificial language employed to represent the semantics of DLS 628:

<for Each V=(V1, ..., Vn) in S>

BRANCH 1

TRANSITION CONDITION TC1:

UPDATE T2 SET T2.a=:V1

WHERE=(V);

BRANCH 2

TRANSITION CONDITION TC2:

UPDATE T2 SET T2.A=2*:V1

WHERE=(V);;

Note that the DLS 628 corresponds to a tuple-based processing of the set S. The PGM comprising DLSs 626 and 628 is optimized by the method in accordance with the present invention. The result is the optimized PGM which is given by DLS 630. DLS 630 corresponds to a set based processing of the set S. DLS 630 is given by the SQL statement:

UPDATE T2 SET T2.A=:V1

WHERE TC1;

UPDATE T2 SET T2.A=2*:V1

WHERE TC2;

The DLS 626 is then transformed into the optimized GOA which corresponds in this example to DMA 610, $DMA_{1w}$ 612 and $DMA_{2w}$ 614. DMA 610 restricts the scope of the DMA to the elements v in S. $DMA_{1w}$ is only executed if TC1 holds and processes a single element of S. $DMA_2$, is only executed if TC2 holds and processes only a single element of S.

In the preceding paragraphs, the four patterns preferably optimized by the method in accordance with the present invention have been described. The pattern optimization depends on the possibility of determining DMAs in the workflow and of determining a GOA. The way the method in accordance with the present invention determines the DMAs and the GOAs is described in the following by way of an example.

Figure 7:
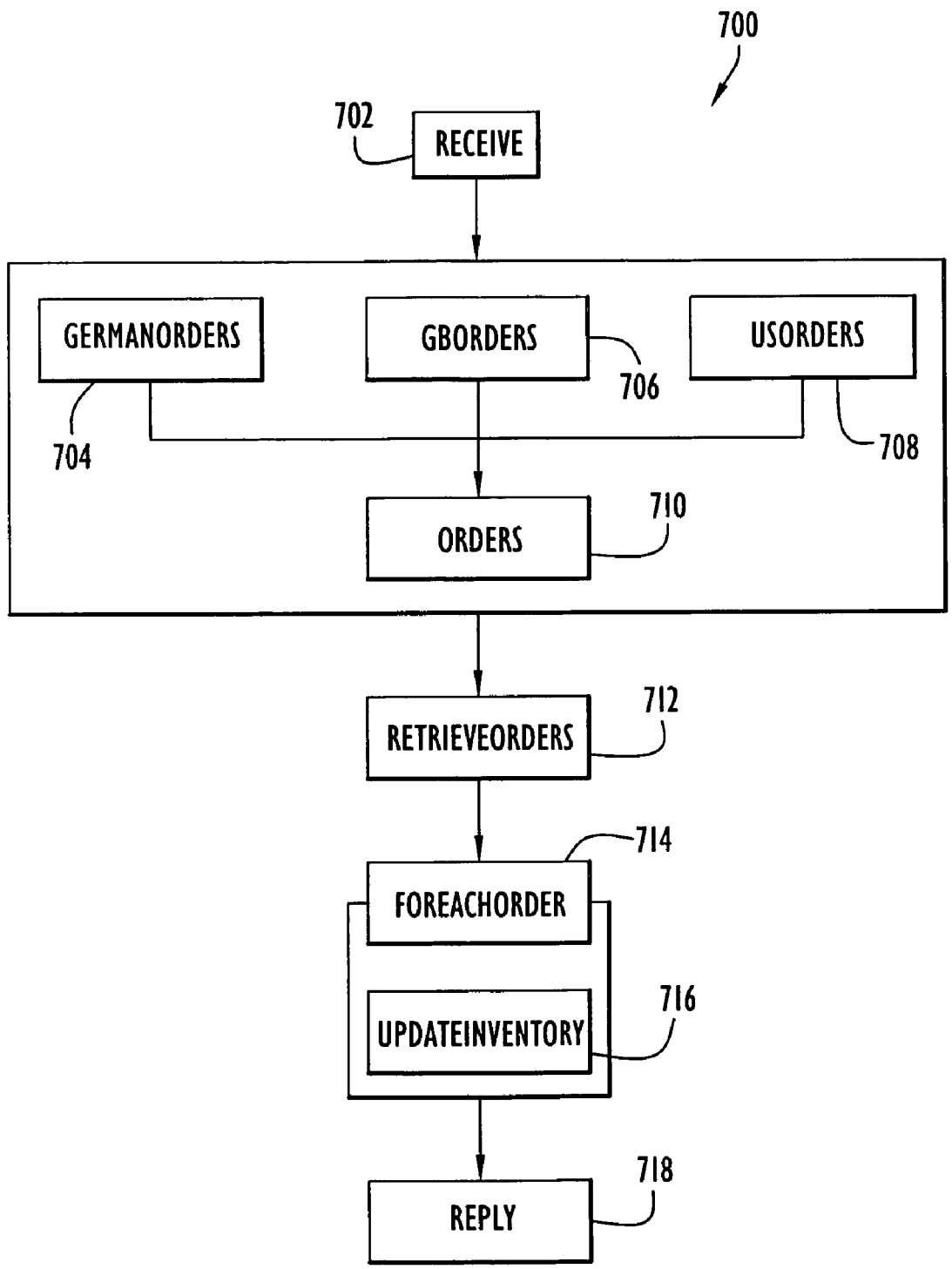
FIG. 7 depicts an example of a workflow.

FIG. 7 depicts a diagram 700 of a workflow implemented in BPEL by use of the WebSphere Integration developer from IBM Corporation. The corresponding BPEL code is schematically given in an abridged form in the following:

1. <?xml version="1.0" encoding="UTF-8"?>
2.    <bpws:process xmlns:bpws="http://schemas.xml-soap.org/ws/2004/03/business-process/" ... >
3. ....
4. <bpws:variables>
5. <bpws:variable name="ResultSet1" type="ns1:tSetReference" wpc:id="10"/>
6. <bpws:variable name="ResultSet2" type="ns1:tSetReference" wpc:id="11"/>
7. <bpws:variable name="ResultSet3" type="ns1:tSetReference" wpc:id="12"/>
8. <bpws:variable name="ResultSet4" type="ns1:tSetReference" wpc:id="13"/>
9. <bpws:variable name="SingleOrder" type="xsd:anyType" wpc:id="14"/>
10. <bpws:variable name="DataSource" type="ns1:tDataSource" wpc:id="19"/>
11. <bpws:variable name="RetrievedResultSet4" type="xsd:anyType" wpc:id="22"/>
12. </bpws:variables>
13. <bpws:sequence name="HiddenSequence" wpc:id="1073741826">

14. <bpws:receive createInstance="yes" name="Receive" operation="operation1" partnerLink="Client" portType="ns0:SourceProcess" wpc:displayName="Receive" wpc:id="3">
15. <wpc:output>
16. <wpc:parameter name="input1" variable="Input1"/>
17. </wpc:output>
18. </bpws:receive>
19. <bpws:flow name="ParallelActivities" wpc:displayName="ParallelActivities" wpc:id="6">
20. <bpws:links>
21. <bpws:link name="Link1" wpc:id="16"/>
22. <bpws:link name="Link2" wpc:id="17"/>
23. <bpws:link name="Link3" wpc:id="18"/>
24. </bpws:links>
25. <bpws:invoke name="GermanOrders" operation="null" partnerLink="null" portType="ns2:null" wpc:displayName="GermanOrders" wpc:id="7">
26. <dma:dataManagementActivity xmlns:dma="http://www.ibm.com/xmlns/prod/websphere/business-process/v6.0/dma" xmlns:xsi="http://www.w3.org/2001/XMLSchema-instance" xsi:schemaLocation="http://www.ibm.com/xmlns/prod/websphere/business-process/v6.0/dma http://www.ibm.com/xmlns/prod/websphere/business-process/v6.0/dma/dataManagementActivity/dma.xsd" xsi:type="dma:tSqlDma">
27. <dma:statement>
28. <dma:dataSource variable="DataSource"/>
29. <dma:resultSetReference variable="ResultSet1"/>
30. <dma:body><![CDATA[SELECT OID, CID, convertEuro2Dollar(TOTPRICE), ITEMID, QUANTITY, DATE FROM myschema.germanorders]]></dma:body>
31. </dma:statement>
32. </dma:dataManagementActivity>
33. <bpws:sources>
34. <bpws:source linkName="Link1"/>
35. </bpws:sources>
36. </bpws:invoke>
37. <bpws:invoke name="GBOrders" operation="null" partnerLink="null" portType="ns2:null" wpc:displayName="GBOrders" wpc:id="8">
38. <dma:dataManagementActivity xmlns:dma="http://www.ibm.com/xmlns/prod/websphere/business-process/v6.0/dma" xmlns:xsi="http://www.w3.org/2001/XMLSchema-instance" xsi:schemaLocation="http://www.ibm.com/xmlns/prod/websphere/business-process/v6.0/dma http://www.ibm.com/xmlns/prod/websphere/business-process/v6.0/dma/dataManagementActivity/dma.xsd" xsi:type="dma:tSqlDma">
39. <dma:statement>
40. <dma:dataSource variable="DataSource"/>
41. <dma:resultSetReference variable="ResultSet2"/>
42. <dma:body><![CDATA[SELECT OID, CID, convertGBP2Dollar(TOTPRICE), ITEMID, QUANTITY, DATE FROM myschema.gborders]]></dma:body>
43. </dma:statement>
44. </dma:dataManagementActivity>
45. <bpws:sources>
46. <bpws:source linkName="Link2"/>
47. </bpws:sources>
48. </bpws:invoke>
49. <bpws:invoke name="USOrders" operation="null" partnerLink="null" portType="ns2:null" wpc:displayName="USOrders" wpc:id="9">
50. <dma:dataManagementActivity xmlns:dma="http://www.ibm.com/xmlns/prod/websphere/business-process/v6.0/dma" xmlns:xsi="http://www.w3.org/2001/XMLSchema-instance" xsi:schemaLocation="http://www.ibm.com/xmlns/prod/websphere/business-process/v6.0/dma http://www.ibm.com/xmlns/prod/websphere/business-process/v6.0/dma/dataManagementActivity/dma.xsd" xsi:type="dma:tSqlDma">
51. <dma:statement>
52. <dma:dataSource variable="DataSource"/>
53. <dma:resultSetReference variable="ResultSet3"/>
54. <dma:body><![CDATA[SELECT OID, CID, TOTPRICE, ITEMID, QUANTITY, DATE FROM myschema.usorders]]></dma:body>
55. </dma:statement>
56. </dma:dataManagementActivity>
57. <bpws:sources>
58. <bpws:source linkName="Link3"/>
59. </bpws:sources>
60. </bpws:invoke>
61. <bpws:invoke name="Orders" operation="null" partnerLink="null" portType="ns2:null" wpc:displayName="Orders" wpc:id="15">
62. <dma:dataManagementActivity xmlns:dma="http://www.ibm.com/xmlns/prod/websphere/business-process/v6.0/dma" xmlns:xsi="http://www.w3.org/2001/XMLSchema-instance" xsi:schemaLocation="http://www.ibm.com/xmlns/prod/websphere/business-process/v6.0/dma http://www.ibm.com/xmlns/prod/websphere/business-process/v6.0/dma/dataManagementActivity/dma.xsd" xsi:type="dma:tSqlDma">
63. <dma:statement>
64. <dma:dataSource variable="DataSource"/>
65. <dma:resultSetReference variable="ResultSet4"/>
66. <dma:body><![CDATA[(SELECT * FROM]]>
67. <dma:setReference displayName="RS1" variable="ResultSet1"/><![CDATA[) UNION ALL (SELECT * FROM]]>
68. <dma:setReference displayName="RS2" variable="ResultSet2"/><![CDATA[) UNION ALL (SELECT * FROM]]>
69. <dma:setReference displayName="RS3" variable="ResultSet3"/><![CDATA[)]]></dma:body>
70. </dma:statement>
71. </dma:dataManagementActivity>
72. <bpws:targets>
73. <bpws:target linkName="Link1"/>
74. <bpws:target linkName="Link2"/>
75. <bpws:target linkName="Link3"/>
76. </bpws:targets>
77. </bpws:invoke>
78. </bpws:flow>
79. <bpws:invoke name="RetrieveOrders" operation="null" partnerLink="null" portType="ns2:null" wpc:displayName="RetrieveOrders" wpc:id="20">
80. <dma:dataManagementActivity xmlns:dma="http://www.ibm.com/xmlns/prod/websphere/business-process/v6.0/dma" xmlns:xsi="http://www.w3.org/2001/XMLSchema-instance" xsi:schemaLocation="http://www.ibm.com/xmlns/prod/websphere/business-process/v6.0/dma http://www.ibm.com/xmlns/prod/websphere/business-process/v6.0/dma/dataManagementActivity/dma.xsd" xsi:type="dma:tRetrieveSetDma">
81. <dma:statement>
82. <dma:from variable="ResultSet4"/>
83. <dma:to variable="RetrievedResultSet4"/>
84. </dma:statement>
85. </dma:dataManagementActivity>
86. </bpws:invoke>

87. <bpws:while name="ForEachOrder" wpc:displayName="ForEachOrder" wpc:id="21">
88. <wpc:documentation>For each t=(OID, CID, TOTPRICE, ITEMID, QUANTITY, DATE) element of RetrievedResultSet4</wpc:documentation>
89. <bpws:condition expressionLanguage="http://www.ibm.com/xmlns/prod/websphere/business-process/expression-lang/built-in/6.0.0/">
90. <wpc:true/>
91. </bpws:condition>
92. <bpws:invoke name="UpdateInventory" operation="null" partnerLink="null" portType="ns2:null" wpc:displayName="UpdateInventory" wpc:id="23">
93. <dma:dataManagementActivity xmlns:dma="http://www.ibm.com/xmlns/prod/websphere/business-process/v6.0/dma" xmlns:xsi="http://www.w3.org/2001/XMLSchema-instance" xsi:schemaLocation="http://www.ibm.com/xmlns/prod/websphere/business-process/v6.0/dma http://www.ibm.com/xmlns/prod/websphere/business-process/v6.0/dma/dataManagementActivity/dma.xsd" xsi:type="dma:tSqlDma">
94. <dma:statement>
95. <dma:dataSource variable="DataSource"/>
96. <dma:body><![CDATA[UPDATE myschema.retailer_storage SET amount = amount - #T.Quantity# WHERE product_id = #T.ITEMID#
97. ]]></dma:body>
98. </dma:statement>
99. </dma:dataManagementActivity>
100. </bpws:invoke>
101. </bpws:while>
102. <bpws:reply name="Reply" operation="operation1" partnerLink="Client" portType="ns0:SourceProcess" wpc:displayName="Reply" wpc:id="4">
103. <wpc:input>
104. <wpc:parameter name="output1" variable="Input1"/>
105. </wpc:input>
106. </bpws:reply>
107. </bpws:sequence>
108. </bpws:process>

This example of a workflow assumes that received orders 702 are stored in three tables in a database: GermanOrders, GBOrders and USOrders. The three correspondingly named activities 704, 706, and 708, respectively are selecting the orders out of these tables by applying a currency transformation function and storing them in new sets. The activity orders 710 is building a union of these sets and stores the resulting set in the database. The resulting set is materialized in the activity RetrieveOrders 712 and the subsequent WHILE loop activity 714 is operating on the elements of the set and executing a corresponding UpdateInventory 716 statement for each element of this set. The flows end with the activity Reply 718.

Figure 8:
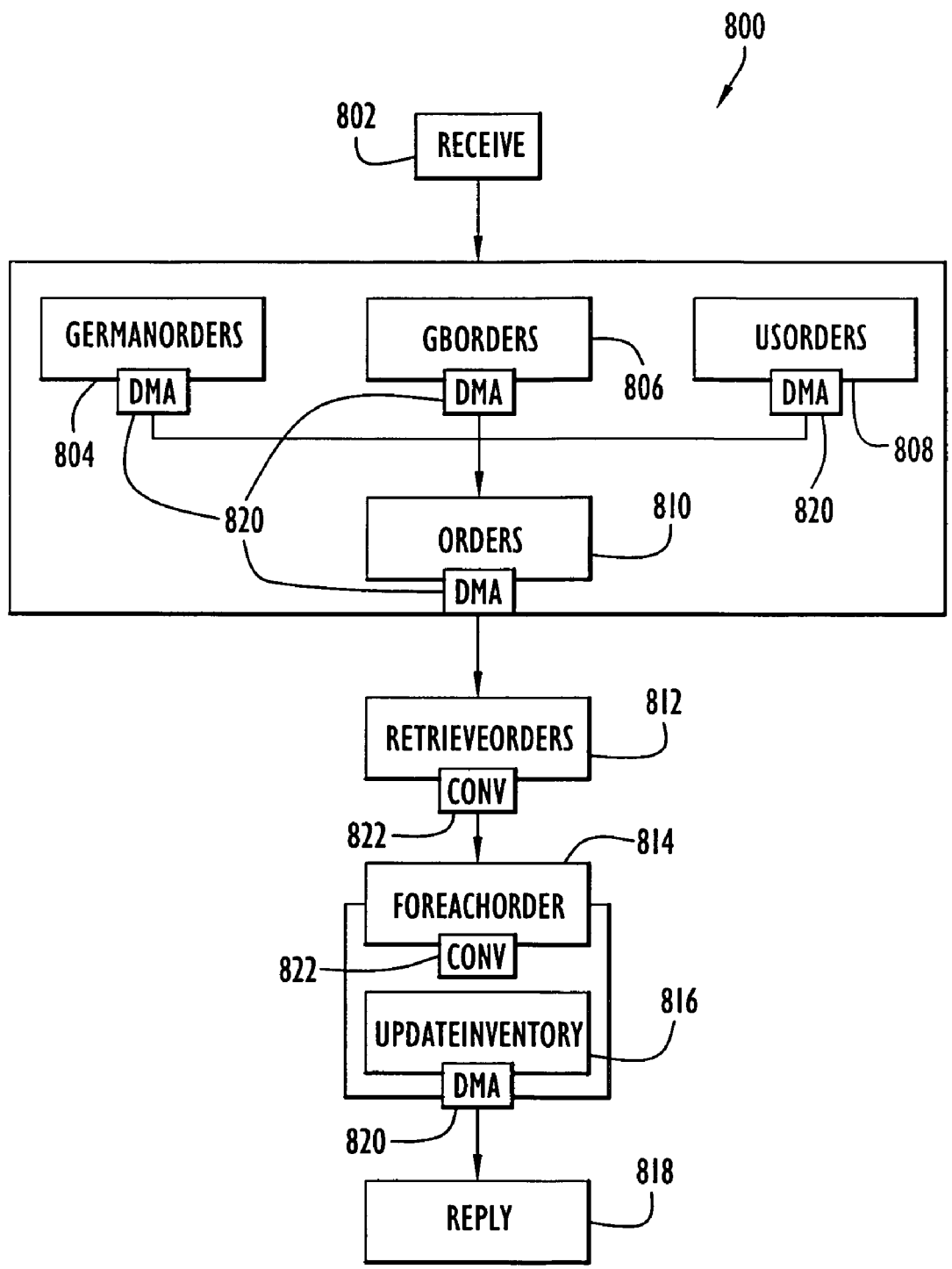
FIG. 8 depicts the annotation phase of a workflow.

FIG. 8 shows schematically a diagram 800 of the annotation phase. The type of an activity is determined by the method in accordance with the present invention by tags or meta data attached to the activity or by use of specific functions provided by the method and system in accordance with the present invention. It is, for example, tagged in line 30 of the BPEL source code given above that the GermanOrder activity is a DMA and the corresponding SQL statement is directly attached to the activity.

In the annotation phase, relevant information is simply added to the workflow, but the structure of the workflow is left unchanged. In this embodiment of the present invention, the activities which are identified as DMAs by use of attached tags or meta data are marked by the symbol DMA 820.

The retrieve order activity 812 and the WHILE loop activity 814 are identified as convertible DMAs by use of the underlying meta data or by use of tags. These activities are marked with the symbol CONV 822. A convertible DMA refers to an activity that can be converted to a DMA, because the originally expressed activity could be mapped to a processing step issued in the data management layer (e.g., a user defined function UDF that might call a web service).

Figure 9:
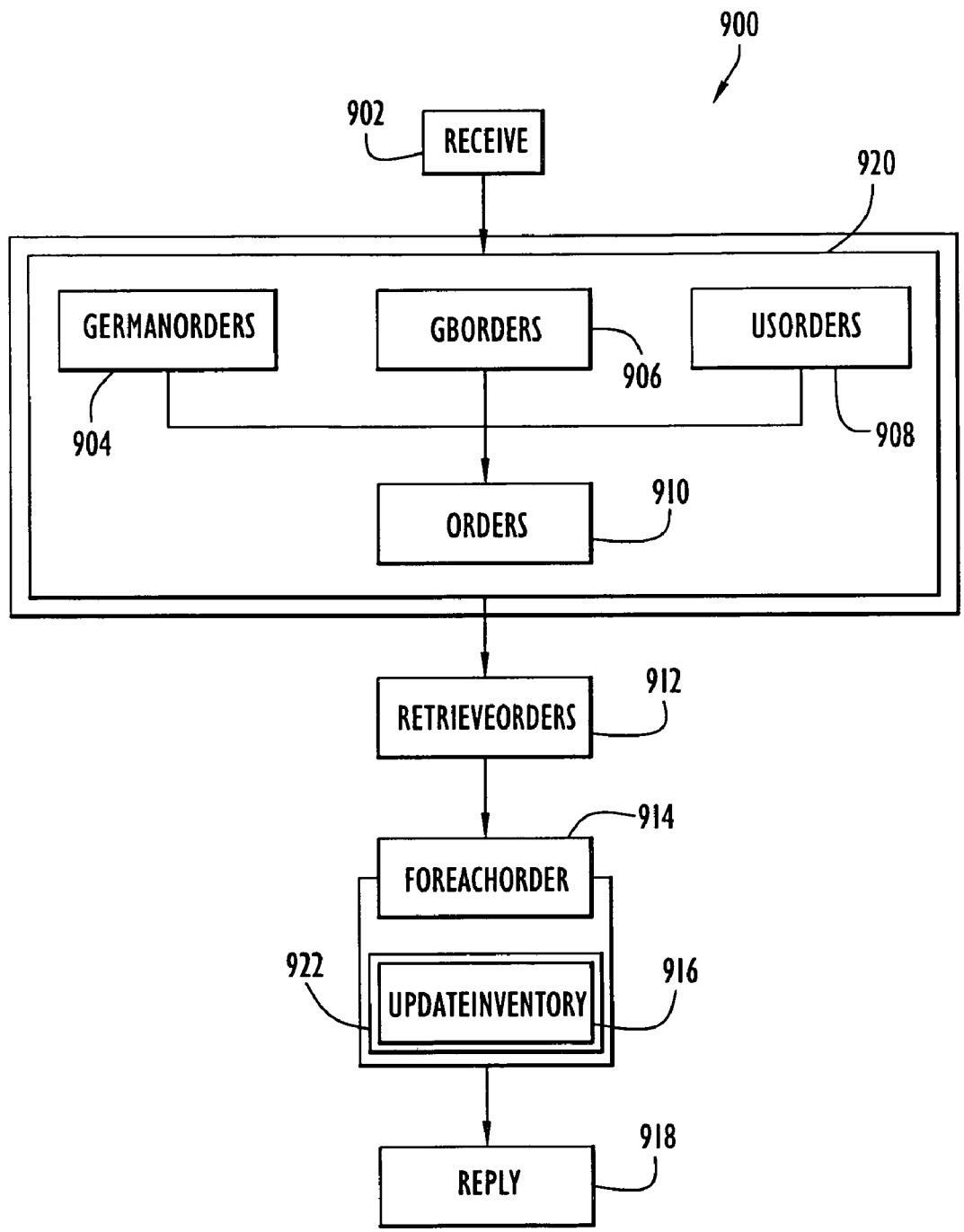
FIG. 9 depicts those GOAs comprised in the workflow that consist only of DMAs.

Diagram 900 of FIG. 9 depicts additionally the group of DMAs 920 and 922 comprised in the workflow. The method in accordance with the present invention determines the DMAs that are linked directly as a group of DMAs to be optimized by the method in accordance with the present invention. Thus, activity GermanOrders 904, GBOrders 906, USOrders 908, and orders 910 are identified as a group of DMAs 920 and UpdateInventory activity 916 is identified as a second group of DMAs 922. The received activity 902, the RetrieveOrders activity 912, the WHILE loop activity 914, and the reply activity 918 are not assigned to a group of DMAs since these activities do not represent any DMA activities. The RetrieveOrders activity 912 is a materialization operation. Pattern II can thus be employed to determine an optimized GOA for the GOA comprising the RetrieveOrders activity 912, the WHILE activity 914 and the DMA 916.

Figure 10:
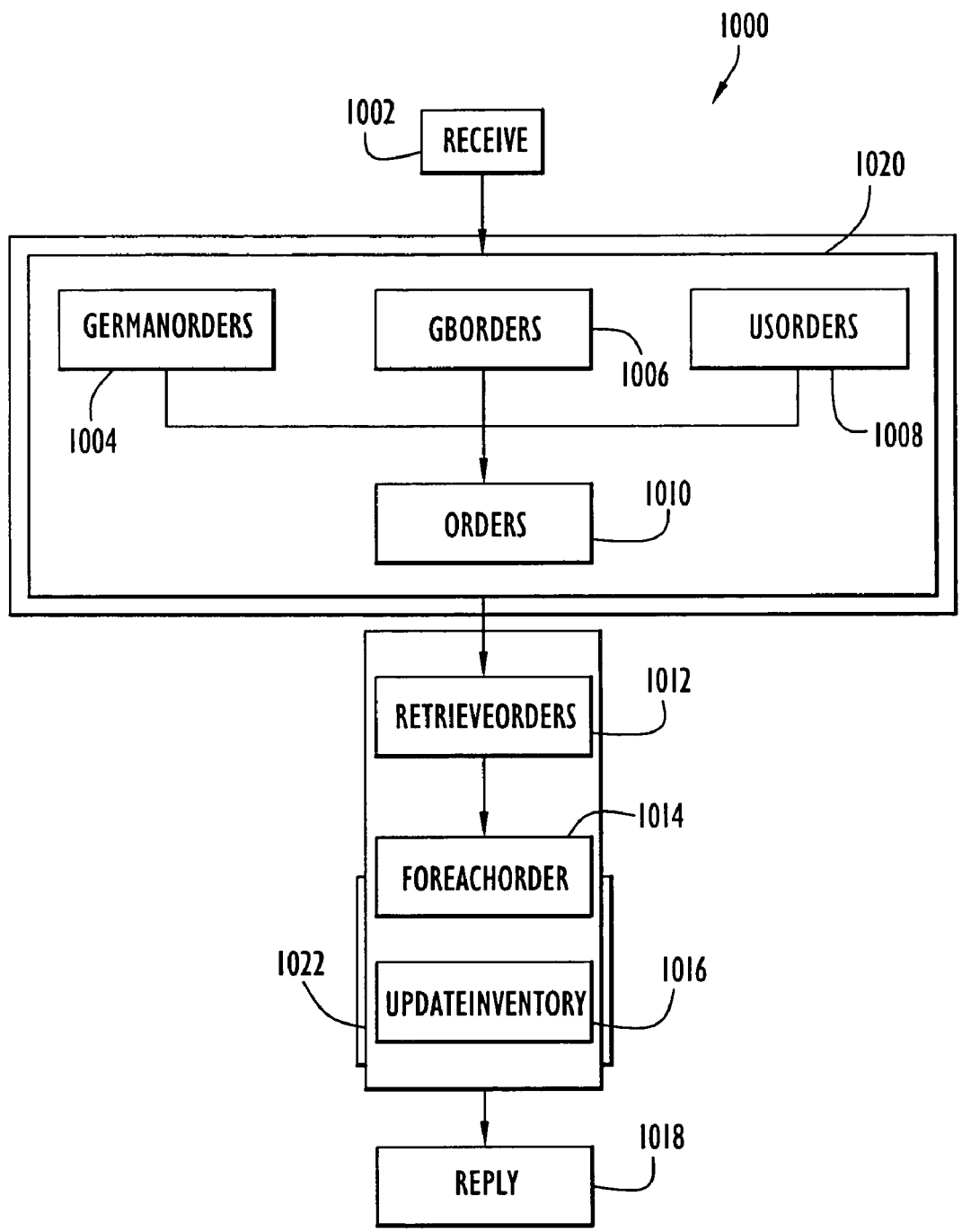
FIG. 10 depicts the GOAs comprised in the workflow and that take the applicability of pattern II into account.

This is depicted in diagram 1000 of FIG. 10. The GOA 1022 contains the RetrieveOrder activity 1012, the WHILE loop activity 1014 and the UpdateInventory activity 1016. As mentioned above, the GOA 1022 comprising the DMAs 1012, 1014, and 1016 shows a tuple based processing of the data and can be optimized according to an optimization pattern II into a set optimized processing. The receive activity 1002 and the reply activity 1018 are not assigned to a group of DMAs. The GermanOrder activity 1004, the GBOrders activity 1006, the USOrder activity 1008 as well as the order activity 1010 are grouped into the GOA 1020 as has been the case in diagram 900. In an embodiment of the present invention, the GOA 1020 and GOA 1022 are optimized separately. GOA 1020 is optimized by use of pattern I and GOA 1022 is optimized by use of pattern II. The optimization is done in a first step by application of the corresponding patterns to the PGMs that correspond to GOA 1020 and 1022, respectively. This results in two optimized PGM, whereby each PGM comprises one DLS.

The DLS which corresponds to the optimized PGM of GOA 1020 is given by: (SELECT OID, CID, convertEuro2Dollar(TOTPRICE), ITEMID, QUANTITY, DATE FROM myschema.germanorders) UNION ALL (SELECT OID, CID, convertGBP2Dollar(TOTPRICE), ITEMID, QUANTITY, DATE FROM myschema.gbporders) UNION ALL (SELECT OID, CID, TOTPRICE, ITEMID, QUANTITY, DATE FROM myschema.usorders)

The DLS which corresponds to the optimized PGM of GOA 1022 is: MERGE INTO myschema.retailer_storage USING RetrievedResultSet4 AS orders ON myschema.retailer_storage.product_id = orders.itemid WHEN MATCHED THEN UPDATE SET myschema.retailer_storage.amount = myschema.retailer_storage.amount - orders.quantity Since the GOA 1020 and GOA 1022 are arranged in a sequence, the two DLS are semantically arranged in a sequence. The two DLS are thus optimized by application of pattern I. This results into one optimized PGM that is semantically equal to the sequence of the two optimized PGMs mentioned above. The optimized PGM can then be transformed into an optimized GOA.

Alternatively, the two DLS mentioned above can be used to determine the corresponding two DMAs. The two DMAs replace GOA 1020 or GOA 1022, respectively in the workflow. The workflow is again optimized by identifying a GOA that comprises the two DMAs that are then optimized according to pattern I.

Figure 11:
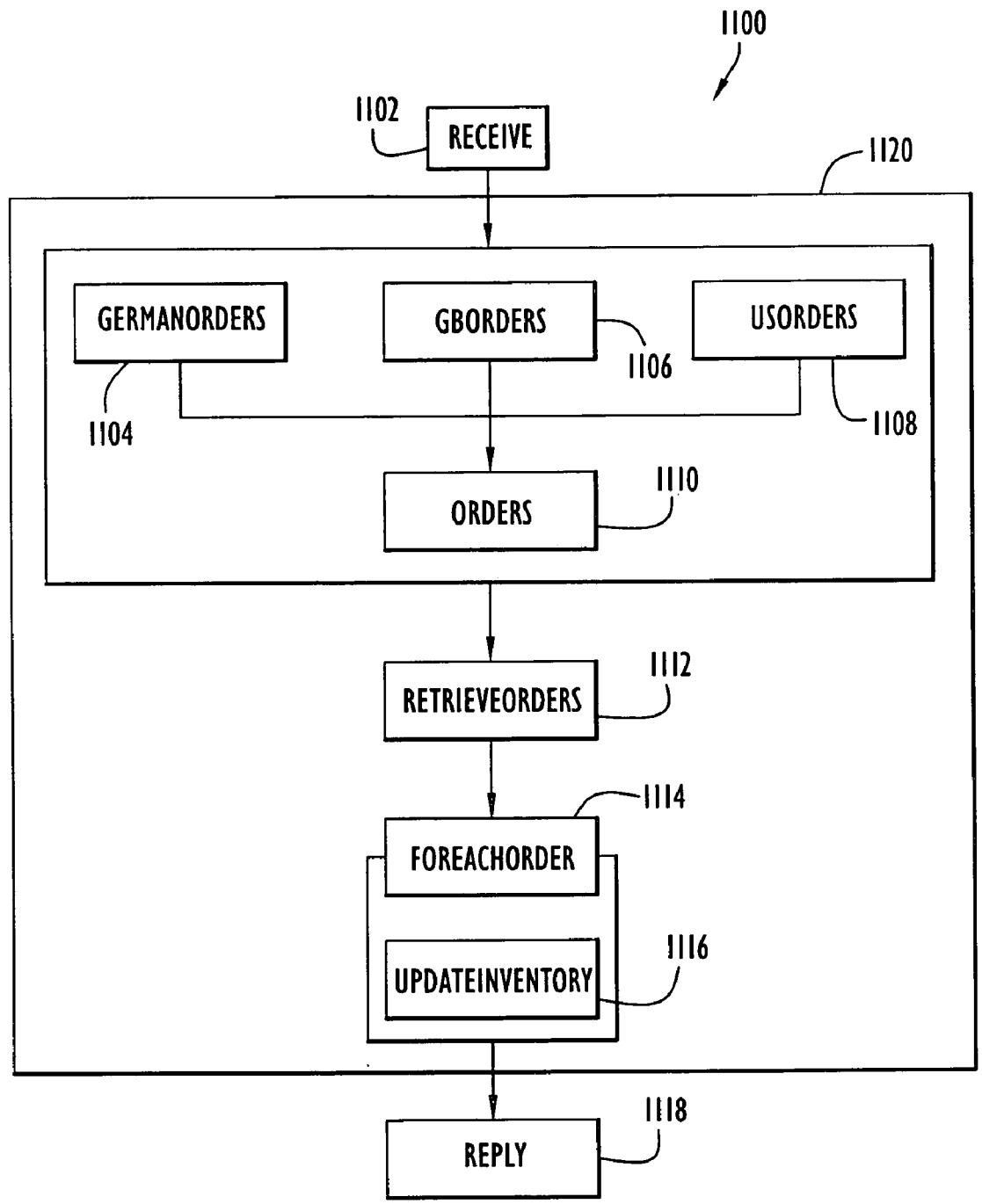
FIG. 11 depicts the merger of two optimized GOAs.

FIG. 11 shows a diagram 1100 of two GOAs that are merged into one GOA by the method in accordance with the present invention. The one GOA can be determined alternatively to the two schemes described above in the following way. Since, as depicted in diagram 1000, the two group of GOAs are linked (the order activity 1110 is connected directly to the RetrieveOrders activities 1112), they are grouped by the method in accordance with the present invention to a single GOA 1120 to be optimized by the method in accordance with the present invention. Thus, the GermanOrder activity 1104, the GBOrders activity 1106, the USOrders activity 1108, the orders activity 1110, the retrieve order activities 1112, the WHILE loop 1114, and the UpdateInventory activity 1116, form one GOA 1120 to be optimized. The receive activity 1102 and the reply activity 1118 are not assigned to the group of DMAs 1120.

The GOA is translated into a PGM which comprises SQL statements. In an embodiment of the present invention, the SQL statements can be directly wrapped into the activities. The PGM can be optimized by the optimization component of an information management system. The optimization component returns a single statement that is semantically equivalent to the logic implemented in the source process. The optimized PGM, which is typically given by one or more SQL statements, is then transformed into an optimized GOA, which replaces the GOA in the workflow.

Figure 12:
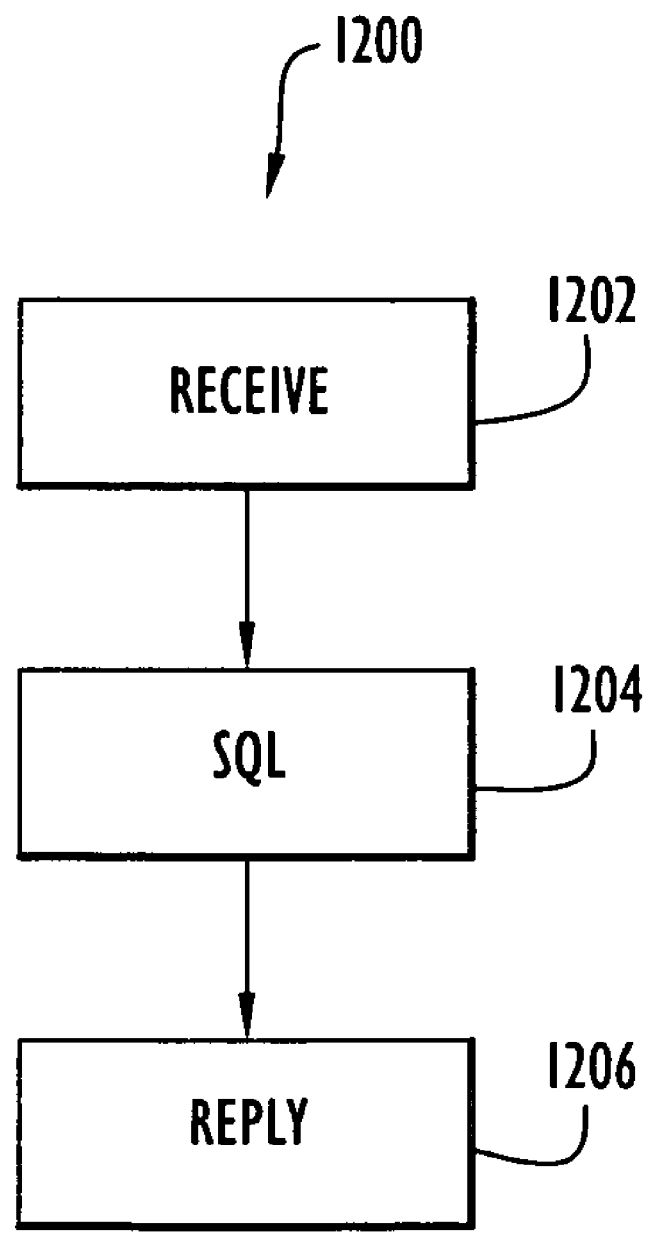
FIG. 12 shows an optimized workflow replacing the original workflow.

FIG. 12 shows a diagram 1200 of how the optimized GOA is implemented in the workflow. The original GOA to be optimized as shown in diagram 1100 is replaced by the GOA comprising a single DMA 1204 which comprises the SQL statement determined by the optimization component. The DMA 1204 is linked to the activity Receive 1202 and the activity Reply 1206 as shown in diagram 1200. The corresponding BPEL code is schematically given in an abridged form in the following. The SQL statement is wrapped into the BPEL code as can be seen in the lines 10 to 27.

1. <?xml version="1.0" encoding="UTF-8"?>
2. <bpws:process . . . >
3. . . .
4. <bpws:variables>
5. <bpws:variable name="DataSource" type="ns2:tDataSource" wpc:id="7"/>
6. </bpws:variables>
7. <bpws:sequence name="HiddenSequence" wpc:id="1073741826">
8. <bpws:receive createInstance="yes" name="Receive" operation="operation1" partnerLink="Client" portType="ns0:TargetProcess" wpc:displayName="Receive" wpc:id="3">
  b. <wpc:parameter name="input1" variable="Input1"/>
9. </bpws:receive>
10. <bpws:invoke name="SQL" operation="null" partnerLink="null" portType="ns1:null" wpc:displayName="SQL" wpc:id="6">
  a. <dma:dataManagementActivity xmlns:dma="http://www.ibm.com/xmlns/prod/websphere/business-process/v6.0/dma" xmlns:xsi="http://www.w3.org/2001/XMLSchema-instance" xsi:schemaLocation="http://www.ibm.com/xmlns/prod/websphere/business-process/v6.0/dma http://www.ibm.com/xmlns/prod/websphere/business-process/v6.0/dma/dataManagementActivity/dma.xsd" xsi:type="dma:tSqlDma">
11. <dma:statement>
12. <dma:dataSource variable="DataSource"/>
13. <dma:body><![CDATA[MERGE INTO myschema.retailer_storage
14. USING
15. ((SELECT OID, CID, convertEuro2Dollar(TOTPRICE), ITEMID, QUANTITY, DATE
16. FROM myschema.germanorders)UNION ALL
17. (SELECT OID, CID, convertGBP2Dollar(TOTPRICE), ITEMID, QUANTITY, DATE
18. FROM myschema.gbporders)UNION ALL
19. (SELECT OID, CID, TOTPRICE, ITEMID, QUANTITY, DATE
20. FROM myschema.usorders)
21.) AS orders
22. ON myschema.retailer_storage.product_id = orders.itemid
23. WHEN MATCHED THEN
24. UPDATE SET myschema.retailer_storage.amount = myschema.retailer_storage.amount - orders.quantity
25. ELSE IGNORE]]></dma:body>
26. </dma:statement>
27. </dma:dataManagementActivity>
28. </bpws:invoke>
29. <bpws:reply name="Reply" operation="operation1" partnerLink="Client" portType="ns0:TargetProcess" wpc:displayName="Reply" wpc:id="4">
  a. <wpc:input>
  b. <wpc:parameter name="output1" variable="Input1"/>
  c. </wpc:input>
30. </bpws:reply>
31. </bpws:sequence>
32. </bpws:process>

LIST OF REFERENCE NUMERALS

| | |
|---|---|
| 100 | block diagram |
| 102 | workflow system |
| 104 | microprocessor |
| 106 | volatile memory device |
| 108 | nonvolatile memory device |
| 110 | workflow design time system |
| 112 | information management system |
| 114 | data processing system for optimizing |
| 116 | database |
| 118 | workflow description editor |
| 119 | data level statement (DLS) |
| 120 | process graph model (PGM) |
| 122 | optimized PGM |
| 124 | group of activities (GOA) |
| 126 | optimized GOA |
| 128 | graphical representation of a workflow |
| 130 | optimization component |
| 132 | graphical user interface |
| 134 | data management activity (DMA) |
| 136 | workflow description |
| 138 | convertible non-DMA |
| 140 | register |
| 200 | schematic depiction |
| 202 | process-description language layer |
| 203 | workflow |
| 204 | activity |
| 206 | activity |
| 208 | activity |
| 210 | activity |
| 212 | activity |
| 214 | activity |

-continued

| | |
|---|---|
| 216 | DMA/DLS determination component |
| 218 | GOA determination component |
| 220 | PGM determination component |
| 222 | optimized PGM/optimized GOA determination |
| 224 | multi-query optimization |
| 226 | SQL artifacts |
| 228 | process-language and infrastructure independent layer |
| 230 | infrastructure dependent layer |
| 300 | pattern I |
| 302 | DMA level |
| 304 | DLS level |
| 306 | DMA |
| 308 | DMA |
| 310 | DMA |
| 312 | DLS |
| 314 | DLS |
| 316 | DLS |
| 400 | pattern II |
| 402 | DMA level |
| 404 | DLS level |
| 406 | materialization operation |
| 408 | loop operation over a DMA |
| 410 | DMA |
| 412 | DLS |
| 414 | DLS |
| 416 | DLS |
| 418 | WHILE loop |
| 420 | DMA |
| 500 | pattern III |
| 502 | DMA level |
| 504 | DLS level |
| 506 | materialization operation |
| 508 | loop operation |
| 510 | DMA |
| 512 | DLS |
| 514 | DLS |
| 516 | DLS |
| 518 | WHILE loop |
| 520 | web service |
| 522 | DMA |
| 600 | pattern IV |
| 602 | DMA level |
| 604 | DLS level |
| 606 | materialization operation |
| 608 | loop operation |
| 610 | DMA |
| 612 | DMA |
| 614 | DMA |
| 616 | WHILE loop |
| 618 | transition condition |
| 620 | transition condition |
| 622 | DMA |
| 624 | DMA |
| 626 | DLS |
| 628 | DLS |
| 630 | DLS |
| 700 | workflow |
| 702 | activity Receive |
| 704 | activity GermanOrders |
| 706 | activity GBOrders |
| 708 | activity USOrders |
| 710 | activity Orders |
| 712 | activity Retrieve Orders |
| 714 | WHILE loop activity |
| 716 | activity UpdateInventory |
| 718 | reply activity |
| 800 | workflow |
| 802 | activity Receive |
| 804 | activity GermanOrders |
| 806 | activity GBOrders |
| 808 | activity USOrders |
| 810 | activity Orders |
| 812 | activity Retrieve Orders |
| 814 | WHILE loop activity |
| 816 | activity UpdateInventory |
| 818 | reply activity |
| 820 | Symbol DMA |
| 822 | Symbol CONV |
| 900 | workflow |
| 902 | activity Receive |
| 904 | activity GermanOrders |
| 906 | activity GBOrders |
| 908 | activity USOrders |
| 910 | activity Orders |
| 912 | activity Retrieve Orders |
| 914 | WHILE loop activity |
| 916 | activity UpdateInventory |
| 918 | reply activity |
| 920 | GOA |
| 922 | GOA |
| 1000 | workflow |
| 1002 | activity Receive |
| 1004 | activity GermanOrders |
| 1006 | activity GBOrders |
| 1008 | activity USOrders |
| 1010 | activity Orders |
| 1012 | activity Retrieve Orders |
| 1014 | WHILE loop activity |
| 1016 | activity UpdateInventory |
| 1018 | reply activity |
| 1020 | GOA |
| 1022 | GOA |
| 1100 | workflow |
| 1102 | activity Receive |
| 1104 | activity GermanOrders |
| 1106 | activity GBOrders |
| 1108 | activity USOrders |
| 1110 | activity Orders |
| 1112 | activity Retrieve Orders |
| 1114 | WHILE loop activity |
| 1116 | activity UpdateInventory |
| 1118 | reply activity |
| 1120 | GOA |
| 1200 | workflow |
| 1202 | activity receive |
| 1204 | activity comprising SQL statement |
| 1206 | activity reply |

What is claimed is:

1. A data processing method for optimizing a group of activities being comprised in a workflow to enhance processing of said workflow, wherein said group of activities comprises at least one data management activity, and said data processing method comprises:
   (a) determining said at least one data management activity;
   (b) determining for each of the at least one data management activity at least one data level statement;
   (c) determining said group of activities;
   (d) determining a process graph model from said determined group of activities, wherein said process graph model comprises each of the at least one data level statements, and wherein the semantics of said process graph model are identical to the semantics of said determined group of activities;
   (e) determining an optimized process graph model from said determined process graph model to enable processing of said optimized process graph model faster than processing of said process graph model;
   (f) determining from said optimized process graph model a group of activities optimized in accordance with said optimized process graph model, wherein the semantics of the optimized group of activities are identical to the semantics of the optimized process graph model; and
   (g) replacing said group of activities in said workflow with said optimized group of activities to enhance processing of said workflow.

2. The method according to claim 1, wherein said workflow comprises at least one convertible non-data management activity, and step (a) further comprises:

(a.1) determining at least one data management activity for each of the at least one convertible non-data management activity.

3. The method according to claim 1, wherein the at least one data management activity and the at least one data level statement are determined by use of one of: a tag being assigned to each of the at least one data management activity, wherein said tag comprises meta information describing the data level statement; and a registered function, wherein said function is adapted to receive the at least one data management activity and returns said meta-information for the at least one data level statement.

4. The method according to claim 1, wherein said determined group of activities includes a sequence of data management activities that relates to an information management system, wherein said information management system comprises an optimization component, and wherein step (e) further comprises:
(e.1) determining the optimized process graph model from said determined process graph model by use of said optimization component of said information management system.

5. The method according to claim 1, wherein step (d) further comprises:
(d.1) determining a process graph model including a pattern; and
step (e) further comprises:
(e.1) determining the optimized process graph model from the determined process graph model by optimizing said pattern.

6. The method according to claim 1, wherein said determined group of activities comprises an activity for performing a loop operation, said activity comprising a data management activity, wherein step (b) further comprises:
(b.1) determining a data level statement for said data management activity;
step (d) further comprises:
(d.1) determining a process graph model comprising a pattern that includes said activity for performing said loop operation and said data level statement; and
step (e) further comprises:
(e.1) determining the optimized process graph model from the determined process graph model by optimizing said pattern.

7. The method according to claim 1, wherein said determined group of activities comprises an activity for performing a loop operation, said activity comprising a data management activity and a web service, wherein step (b) further comprises:
(b.1) determining a data level statement for said data management activity and said web service;
wherein step (d) further comprises:
(d.1) determining a process graph model comprising a pattern including said activity for performing said loop operation and said data level statement; and
step (e) further comprises:
(e.1) determining the optimized process graph model from the determined process graph model by optimizing said pattern.

8. The method according to claim 1, wherein said determined group of activities comprises an activity for performing a loop operation, said activity comprising a data management activity and a transition condition, wherein step (b) further comprises:
(b.1) determining a data level statement for said data management activity and said transition condition;
step (d) further comprises:
(d.1) determining a process graph model comprising a pattern including said activity for performing the loop operation and said data level statement; and
step (e) further comprises:
(e.1) determining the optimized process graph model from the determined process graph model by optimizing said pattern.

9. The method according to claim 1, wherein the workflow is implemented in a workflow programming language and a redundant workflow variable comprised in the determined group of activities is eliminated if it is redundant with respect to the workflow.

10. The method according to claim 1, wherein step (b) further comprises:
(b.1) determining the at least one data level statement for each of the at least one data management activity by use of one of an interactive and a collaborative optimization component.

* * * * *